Figure 1:
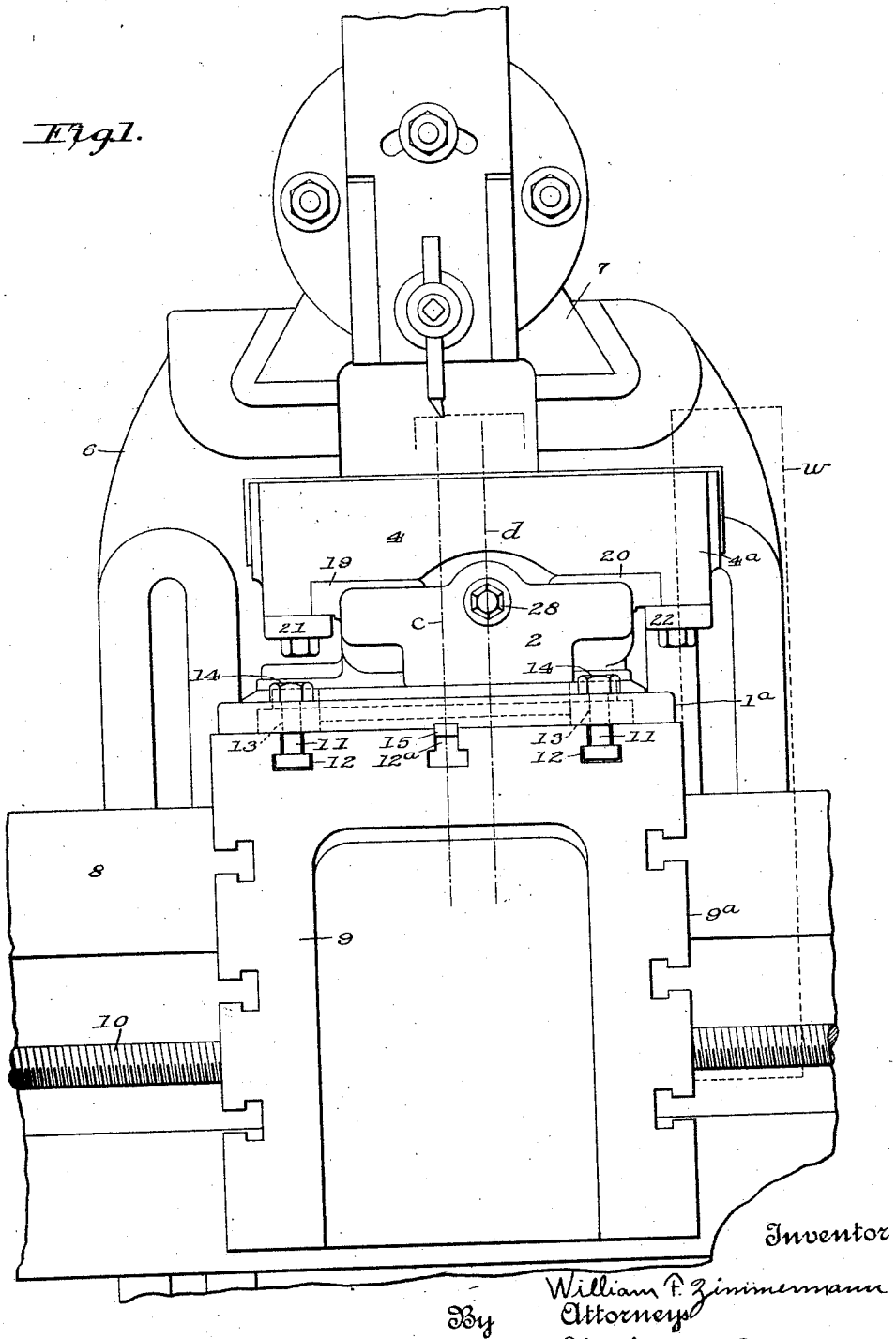

Nov. 6, 1928.

W. F. ZIMMERMANN

ECCENTRIC VISE

Filed May 12, 1927       2 Sheets-Sheet 2

1,690,611

Inventor
William F. Zimmermann
By Attorneys
Nathan & Bowman

Patented Nov. 6, 1928.

1,690,611

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

ECCENTRIC VISE.

Application filed May 12, 1927. Serial No. 190,920.

To effect machining of a work-piece with precision two things are essential. First, the work must be properly aligned and rigidly supported, and second, that portion of the work to be machined must be accurately presented to the action of the tool.

Considerable difficulty heretofore has been experienced in the operation of certain machine tools (for example shaping machines) when operating upon certain work-pieces for the reason that, due to the shape or proportions of the work-piece it was difficult, and in some instances impossible, rigidly to support the work so that the tool could be brought into engagement with the portion to be machined.

Shaping machines as commonly constructed include a frame; a horizontally reciprocating ram which is movable on the frame and which carries a suitable cutting tool; a table, also mounted on the frame and adapted to be given feeding movements transverse to the path of movement of the tool; and a workholder mounted upon the table and adapted to hold a work-piece to be machined by the reciprocating tool. This work-holder has relatively movable work-holding jaws and is commonly called a "vise".

In the operation of shaping machines on various work-pieces it is frequently necessary that the path of reciprocation of the tool be at various angles to the faces of the work held between the work-holding jaws. To that end, the vises are commonly constructed with a base member, adapted to be fixed upon the machine table, and the vise proper is swiveled upon said base member on a vertical axis so that the vise and the work-piece carried thereby, may be rotated in a horizontal plane relative to the path of movement of the tool.

One of the instances in which difficulty heretofore has been experienced is in machining the end of a relatively long work-piece. To effect this operation it is necessary that the work-piece be held vertically and, as the length of the work-piece was too great to permit it to be clamped in the vise in the usual manner (inasmuch as interference would result between the lower portion of the workpiece and the vise base or the table) special means had to be provided for holding the work. In an endeavor to utilize a concentric vise for this work certain manufacturers have secured the vise base to the table with the center of the vise and the pivotal center at one side (usually the right) of the center of the table. Then by making the vise jaws sufficiently long so that they would project beyond the base of the vise and beyond the side of the table the overhanging portion of the jaw could be utilized to grip the vertically arranged work-piece. This practice, however, has not been entirely satisfactory since it placed the axis of the swivel to one side of a vertical plane intersecting the center of the table and therefore necessitated the utilization of a base member which was relatively small and which therefore did not effectively maintain the vise against rocking motion during the cutting operation. It is to be remembered that the edge of the base must not overhang the work aligning face of the table.

This invention has for an object to overcome the difficulties heretofore experienced when attempting to machine a relatively long work-piece and it proposes an improved vise adapted to align and rigidly support such a work-piece without resorting to the use of jaws of abnormal length or of a base which is objectionably small.

Another object of the invention is to provide a balanced eccentric vise, that is, one in which the vise-jaws extend substantially equal distances to the opposite sides of their usual actuating screw and in which said jaws and screw are arranged eccentric to the swivel between the base and the vise proper and about which the vise proper may be swung.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
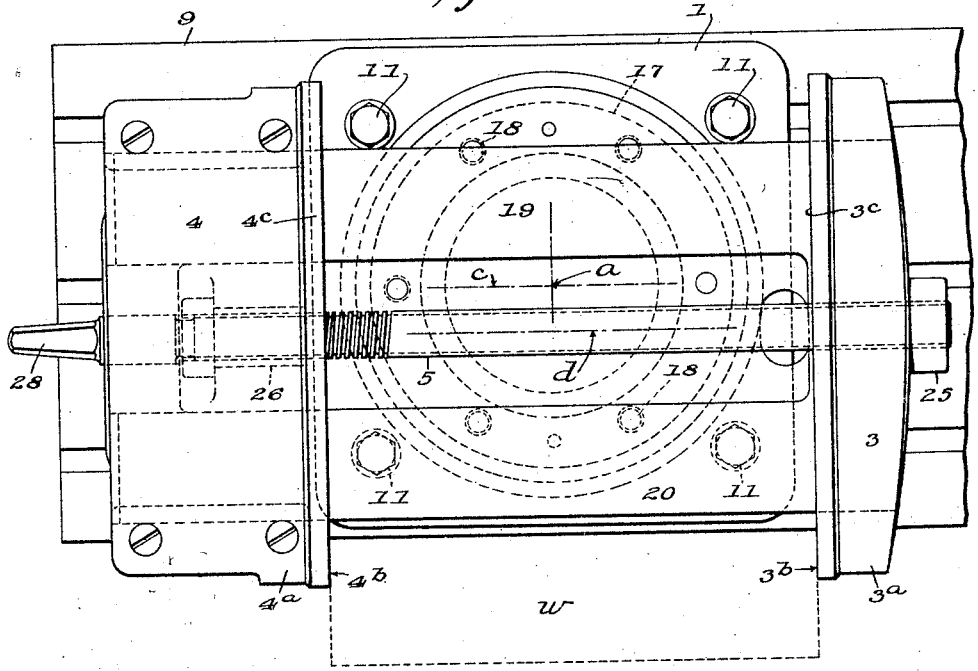
Figure 3:
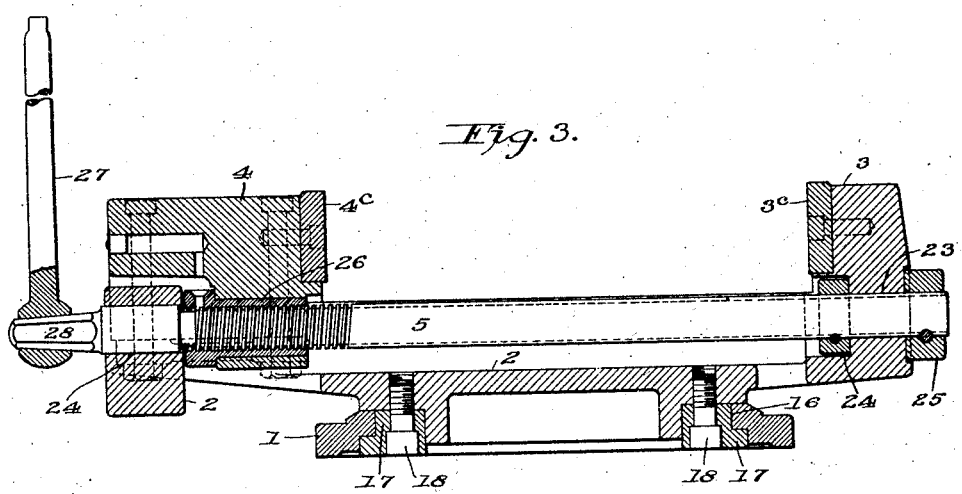

Fig. 1 is a front end view of a portion of a shaping machine equipped with a vise embodying the present invention. Fig. 2 is a plan of the improved vise, showing it attached to a portion of a suitable supporting table. Fig. 3 is a longitudinal section through the vise.

Referring more particularly to the drawings, the invention is disclosed as embodied in a vise comprising a base member 1, adapted to be secured upon a suitable support; a body member 2; relatively movable work-holding jaws 3 and 4 and a jaw-actuating screw 5. Inasmuch as the improved vise is of particular utility when used as a work-holder for shaping machines it is illustrated as applied to that type of machine tool which, as shown in Fig. 1, includes a frame 6 supporting a reciprocating tool-carrying ram 7, a horizontally disposed rail 8 and a work-table 9 slidingly mounted upon said rail and adapted to be fed therealong step-by-step during the operation of the machine, as by means of an intermittently rotated screw 10 having a threaded connection with said table. The base member 1 of the vise may be secured to the table 9 by means of bolts 11 having their heads fitted to T-slots 12 in the upper face of the table and having their shanks passed through apertures 13 in the base member and receiving clamp nuts 14. A guide-block 15 secured to the base member 1 is fitted to a central slot 12$^a$ in the table and serves as a guide for the base member when the nuts 13 are released and the vise is shifted lengthwise of the table, as is customary in this type of machine tool.

To permit angular adjustment of the vise proper (i. e. the member 2 and the parts carried thereby) relative to the base member, the base 1 and the body member 2 are connected together by means of a swivel connection best shown in Figs. 2 and 3, the axis $a$ of which is preferably, but not necessarily, in the center of the base member 1. The center line of the base member is indicated by the dot-dash lines $c$ in Figs. 1 and 2. This swivel preferably is provided by forming the base member with an undercut circular opening 16 to which a cylindrical portion 17 of the body member is fitted. For convenience in manufacturing and assembling the portion 17 may be made as a separate part attached to the body member 2 by screws 18. From the foregoing it will be perceived that the base member 1 is adjustable on its support and that the vise proper is adjustable angularly on the base member. Conventional means (not shown) may be provided to lock the body member 2 to the base member 1 in any desired angular position.

As hereinbefore stated, an important feature of this invention resides in the location of the jaws 3 and 4 and adjusting screw 5 relative to the axis of the swivel, to the end that the jaws may project to one side of the base portion and the support therefor and thereby be adapted to grip a vertically disposed work-piece of substantial length. This has been attained by locating the cylindrical swivel portion 16 a substantial distance at one side of the center of the body member 2, therefore, when the portion 16 is operatively connected with the circular opening 16, the ends 3$^a$ and 4$^a$ of the jaws project a substantial distance beyond the edge 1$^a$ of the base 1 and beyond the face 9$^a$ of the table 9 and serve to grip a vertically arranged work-piece $w$ of considerable length, as shown in Figs. 1 and 2. The center line of the body member 2, the jaws 3 and 4 and the screw 5 is represented by the dot-dash lines $d$ in Figs. 1 and 2. The overhanging portions of the jaws not only serve to grip the work-piece but the vertically disposed faces 3$^b$ and 4$^b$ respectively, being at right angles to the vertically disposed face 9$^a$ of the table 9 cooperate therewith to square up a work-piece, the end of which it is desired to machine.

Preferably the jaw 3 is formed integral with the body member 2 and the jaw 4 is adjustably mounted thereon. To guide the jaw 4 in its movement on the body member the latter is formed with finished guides 19 and 20 to which the jaw 4 is fitted as shown in Fig. 1. Straps 21 and 22 fixed to the underside of the jaw 4 engage the under sides of the guides 19 and 20 and prevent upward movement of the jaw. The jaws 3 and 4 are preferably provided with the customary wear plates 3$^c$ and 4$^c$ respectively.

To effect relative movement between the jaws, thereby to cause the work-piece to be gripped or released, a screw 5 is rotatably but non-translatably journaled in bearings 23 and 24 provided by the body member, at one side of the axis of the swivel and substantially midway between the ends of the jaws. Collars 24 and 25 fixed to the screw at opposite sides of the bearing 23 prevent axial movement of the screw. Within the jaw 4 there is secured a nut 26, having a threaded engagement with the screw 5, therefore upon rotation of the screw, as by means of a wrench 27 applied to the hexagonal end 28 thereof, the jaw 4 will be shifted either toward or from the jaw 3 dependent upon the direction of rotation of said screw.

From the foregoing it will be perceived that this invention has provided a vise which is better adapted accurately to align and rigidly to support work-pieces of substantial length than are prior devices of this nature. It will also be perceived that by locating the center of the jaws and the adjusting screw eccentric to the swivel the jaws may be given the desired overhang without having them objectionally long and without excessive overhang of the jaw guide 20, thereby eliminating the undesirable flexure inherent in relatively long jaws.

Although the improved vise is shown as overhanging the right side of the work table it is to be understood that the swivel permits it to be swung to various other positions. For example, the vise may be turned ninety degrees in either direction from the position shown in Fig. 2. Should it be turned clockwise the overhang will be toward the end of the table and by reason of the fact that the vise is bodily adjustable lengthwise of the table the jaws may be caused to overhang the end of the table.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptions should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. In combination with a shaping machine having a work table providing vertically disposed work-aligning side faces; a work-holder comprising a base member substantially the width of said table adapted adjustably to be secured thereto; a body member mounted on said base member with its center line at one side of the center line of said base member; a swivel connection between said base member and said body member, the axis of said swivel connection being at one side of the center line of said body member; and relatively movable work-holding jaws carried by said body member, said jaws projecting beyond the sides of said body member and extending substantially different distances to opposite sides of the center line of said base member, one end of said jaws overhanging one edge of said base member and the adjacent work-aligning side face of said table to grip a vertically extending work-piece aligned by said side face of the table, said body member being adapted to be swung about said axis to cause said ends of the jaws to overhang the other work-aligning side face of said table to grip a work-piece aligned by the last named side face.

2. In a shaping machine, in combination, a table having vertically disposed side faces each adapted to align a work-piece in one vertical plane; a vise mounted on said table and comprising a base portion adjustably secured upon said table; a body member swiveled to said base member on an axis located at that side of the center of said body member toward one work-aligning side face of said table; relatively movable work-holding jaws supported by said body member and extending substantially equal distances on opposite sides of the center line of said body member, said jaws being provided with work-engaging surfaces in vertical planes at right angles to the side faces of said table and having ends which in one position of said body member overhang one of said side faces to align and grip a work-piece in contact with the said one of said faces, said body member being adapted to be swung about said axis to cause said ends of the jaws to overhang the other side face of said table to grip a work piece in contact with the last named side face; and means to give said jaws relative movement.

In witness whereof, I have hereunto subscribed my name.

WILLIAM F. ZIMMERMANN.